United States Patent [19]

Negi

[11] Patent Number: 5,137,244
[45] Date of Patent: Aug. 11, 1992

[54] VEHICLE SEAT

[75] Inventor: Yoshitaka Negi, Washizu, Japan

[73] Assignee: Fujikiko Kabushiki Kaisha, Tokyo, Japan

[21] Appl. No.: 589,044

[22] Filed: Sep. 27, 1990

[30] Foreign Application Priority Data

Sep. 30, 1989 [JP] Japan .................. 1-115178[U]

[51] Int. Cl.⁵ .............................................. B60N 1/08
[52] U.S. Cl. ................................... 248/430; 248/429
[58] Field of Search ................ 248/430, 429; 297/473

[56] References Cited

U.S. PATENT DOCUMENTS 4,262,963  4/1981  Bauer et al. ................ 248/430 X
4,685,716  8/1987  Kondo ........................ 248/429 X
4,940,285  7/1990  Suzuki et al. ............... 248/430 X
5,011,209  4/1991  Takarabe et al. ............ 248/430 X

FOREIGN PATENT DOCUMENTS 8957    1/1980  Japan ................................ 248/430
178450  8/1987  Japan ................................ 248/430

Primary Examiner—Alvin C. Chin-Shue
Attorney, Agent, or Firm—Hopkins & Thomas

[57] ABSTRACT

In a vehicle seat provided with a seat belt anchor attached to a seat base plate or a seat sliding rail, a lower rail reinforcing member is provided for a lower rail in the vicinity of a seat belt anchor mounting portion, to increase strength of the lower rail required at vehicle collision.

1 Claim, 4 Drawing Sheets

VEHICLE SEAT

BACKGROUND OF THE INVENTION

Field of the Invention

The present invention relates to a vehicle seat slidable in the vehicle front and rear direction, and more specifically to the vehicle seat provided with a seat belt anchor attached to a seat base plate or a seat sliding device.

In vehicle seats for automotive vehicles, seat sliding devices are widely adopted so that the seat can be slid in the vehicle front and rear direction according to the driver's body for improvement of driver's driving comfortability.

In the slidable vehicle seats, a pair of lower rails are fixed on a vehicle body floor extending in the vehicle front and rear direction with a predetermined interval; a pair of upper rails are slidably engaged with the lower rails; and a pair of seat base plates for supporting the seat cushion are fixed to the upper rails, respectively.

On the other hand, a seat belt is attached near the vehicle seat to protect the driver from shock generated at collision. In general the seat belt is connected to a belt anchor directly fixed to the vehicle body floor because the vehicle body floor is high in rigidity. In this case, however, there exists a problem in that the length of the seat belt must be adjusted whenever the seat is slid in the front and rear direction. To overcome this problem, a method of directly attaching the seat belt anchor to the seat sliding device or the seat base plate has recently been proposed.

In the vehicle seat to which a seat belt anchor is directly attached, however, in case a shock is applied to the vehicle body at collision, since a large load is applied to the upper rail via the seat belt anchor and the seat base plate there exists a serious problem in that the lower rails engaged with the upper rails are deformed and therefore the upper rails are removed from the lower rails, without protecting the driver from shock by the seat belt at vehicle collision.

SUMMARY OF THE INVENTION

With those problems in mind, therefore, it is the object of the present invention to provide a vehicle seat which can prevent the lower rail from being deformed at vehicle collision by the seat belt anchor attached to the seat base plate fixed to the upper rail.

To achieve the above-mentioned object, the vehicle seat according to the present invention is characterized in that a lower rail reinforcing member for preventing a lower rail from being deformed is provided for the lower rail in the vicinity of a seat belt anchor mounting portion.

In the vehicle seat according to the present invention, since a lower rail reinforcing member is provided for the lower rail near the seat belt anchor mounting portion, in case a large load is applied to the lower rail at collision, for instance, it is possible to effectively prevent the lower rail from being deformed or further the upper rail from being removed from the lower rail. Therefore, it is possible to improve the safety of the seat belt whose one end is connected to the seat belt anchor attached to the vehicle seat, so that the driver can be protected from shock by the seat belt without colliding against the instrument panel in case of accident.

DESCRIPTION OF THE PREFERRED EMBODIMENTS

Embodiments

Embodiments of the vehicle seat according to the present invention will be described hereinbelow with reference to the attached drawings.

Figure 1:
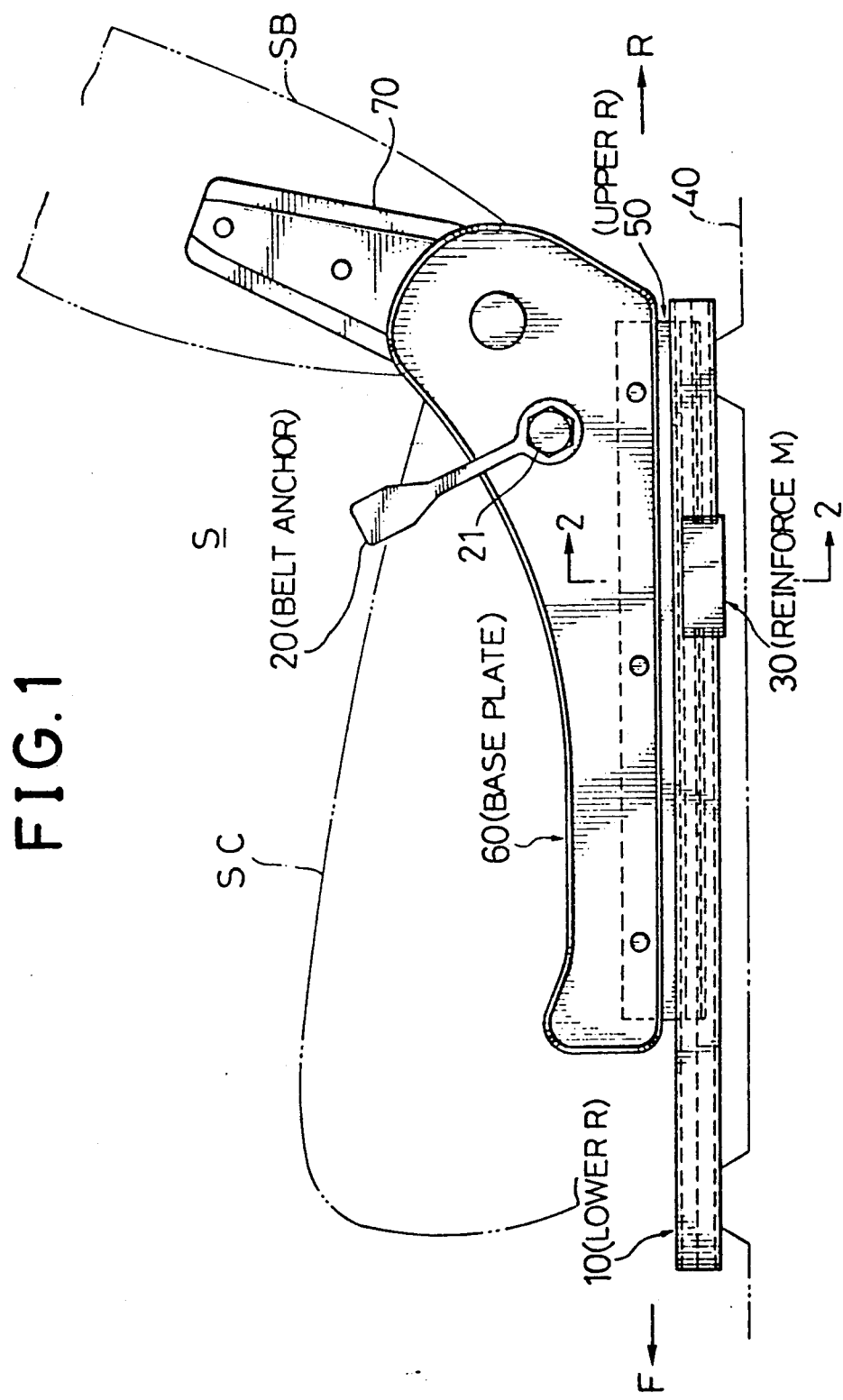
FIG. 1 is a side view showing a vehicle seat according to the present invention.

In FIG. 1, a vehicle seat S having a seat cushion SC and a seat back SB comprises a lower rail reinforcing member 30 for preventing lower rail deformation is provided for the lower rail in the vicinity of a position at which a seat belt anchor 20 is attached.

Figure 2:
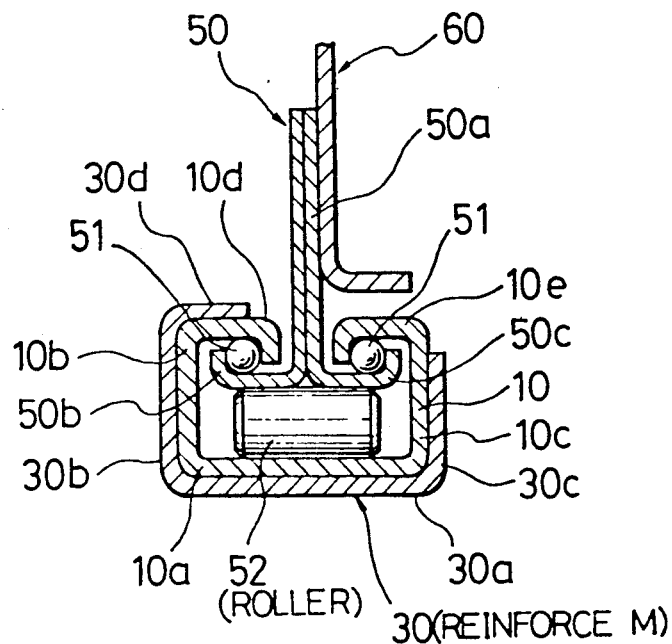
FIG. 2 is a cross-sectional view taken along the line 2—2 shown in FIG. 1, which shows a first embodiment thereof.

The construction of the vehicle seat according to the present invention will be described in further detail hereinbelow with reference to FIGS. 1 and 2.

A pair of lower rails 10 are fixed on a vehicle floor 40 as to extend in the vehicle front and rear direction (the arrow directions F and R in FIG. 1) at a predetermined interval (only one rail is shown in FIG. 1). The lower rail 10 is formed with, when seen in cross section, a base wall portion 10a facing the floor 40, two side wall portions 10b and 10c extending from both sides of the base wall portion 10a in the direction remote from the floor, and two flange portions 10d and 10e inwardly bent from the upper ends of the side wall portions 10b and 10c respectively, into a roughly reverse U-shape.

A lower rail reinforcing member 30 is pressure fitted to the outside surface of the lower rail 10 in the vicinity of a seat belt anchor (20) mounting portion as shown in FIG. 1. This lower rail reinforcing member 30 is formed with, when seen [n cross section, a bottom wall portion 30a in contact with the base wall portion 10a of the lower rail 10; two side wall portions 30b and 30c extending from both sides of the bottom wall portion 30a in contact with the two side wall portions 10b and 10c of the lower rail 10, respectively; and a flange portion 30d inwardly bent from the upper end of the side wall portion 30b in contact with the flange portion 10d of the lower rail 10.

An upper rail 50 is formed with, when seen in cross section, two upright wall portions 50a; two U-shaped upwardly bent portions 50b and 50c extending toward the left and right sides from the lower ends of the upright wall portions 50a so as to oppose the two flange portions 10d and 10e of the lower rail 10, respectively.

The upper rail 50 is slidably engaged with the lower rail 10 by interposing slider rollers 52 between the U-shaped upwardly bent portions 50b and 50c of the upper rail 50 and the base wall portion 10a of the lower rail 10 and further slicer balls 51 between the U-shaped upwardly bent portions 50b and 50c of the upper rail 50 and the two flange portions 10d and 10e of the lower rail 10, so as to be movable in the vehicle front and back direction.

The upper ends of the two upright wall portions 50a of the upper rail 50 are fixed to a seat base plate 60 for supporting the seat cushion SC, and further a back arm 70 (shown in FIG. 1) for supporting the seat back SB is pivotally supported by this seat base plate 60. Further, a seat belt anchor 20 is pivotally attached to the seat base plate 60 via a bolt 21.

The function of the first embodiment of the vehicle seat according to the present invention will be described hereinbelow.

In case a large tensile load is applied to the seat base plate 60 via the seat belt anchor 20 at vehicle collision, for instance, since the load is transmitted to the lower rail 10 via the upper rail 50, the lower rail 10 is pulled in the upward direction. In this embodiment, however, since the lower rail reinforcing member 30 is provided for the lower rail 10 integral therewith in the vicinity of the seat belt anchor (20) mounting portion, the rigidity of the lower rail 10 is increased, so that it is possible to prevent the lower rail 10 from being deformed or the upper rail 50 from being removed from the lower rail 10. In other words, it is possible to improve the safety of the vehicle seat provided with the seat belt, by protecting the driver with the seat belt from collision against the instrument panel, for instance.

Figure 3A:
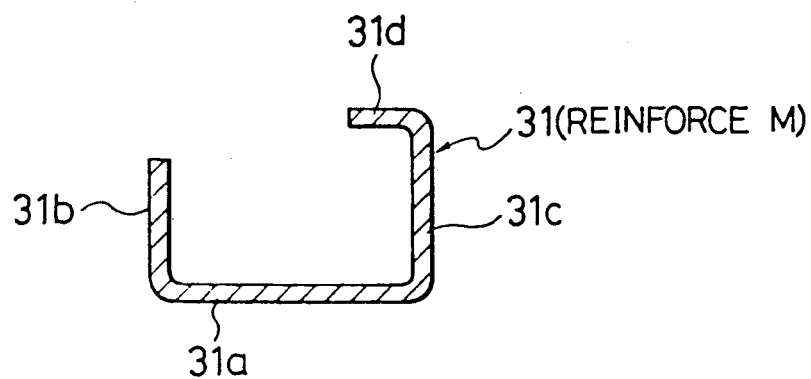
FIG. 3(a) (b) and (c) are similar cross-sectional views showing modifications of the first embodiment of the lower rail reinforcing member.

FIGS. 3(a), (b) and (c) show cross sections of some modifications of the first embodiment of the lower rail reinforcing member according to the present invention. The lower rail reinforcing member 31 shown in FIG. 3(a) is pressure fitted to the outside surface of the lower rail 10 in the vicinity of the seat belt anchor (20) mounting portion in the same way as shown in FIG. 2. This lower rail reinforcing member 31 is formed with a bottom wall portion 31a in contact with the base wall portion 10a of the lower rail 10; two side wall portions 31b and 31c extending from both sides of the bottom wall portion 31a in contact with the two side wall portions 10b and 10c of the lower rail 10, respectively; and a flange portion 31d inwardly bent from the upper end of the side wall portion 31c in contact with the flange portion 10e of the lower rail 10.

Figure 3B:
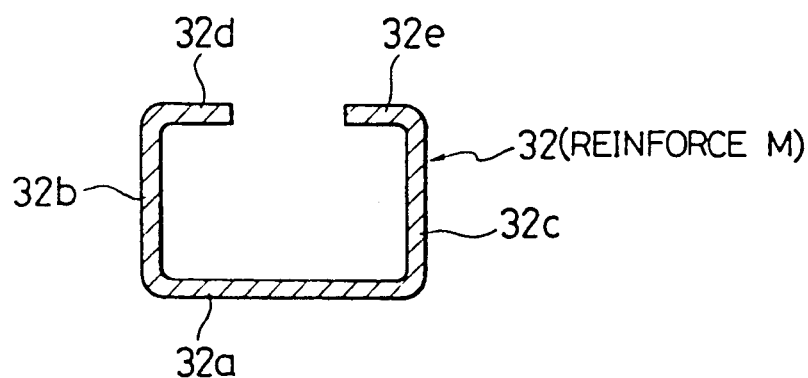

The lower rail reinforcing member 32 shown in FIG. 3b) is formed with a bottom wall portion 32a in contact with the base wall portion 10a of the lower rail 10; two side wall portions 32b and 32c extending from both sides of the bottom wall portion 32a in contact with the two side wall portions 10b and 10c of the lower rail 10, respectively; and two flange portion 32d and 32e inwardly bent from the upper ends of the two side wall portions 32b and 32c, respectively in contact with the two flange portions 10d and 10e of the lower rail 10.

Figure 3C:
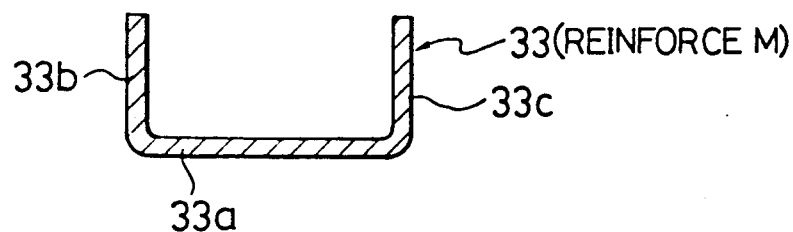

Further, the lower rail reinforcing member 33 shown in FIG. 3(c) is formed with a bottom wall portion 33a; and two side wall portions 33b and 33c extending from both sides of the bottom wall portions 32a, without any flange portions.

Figure 4:
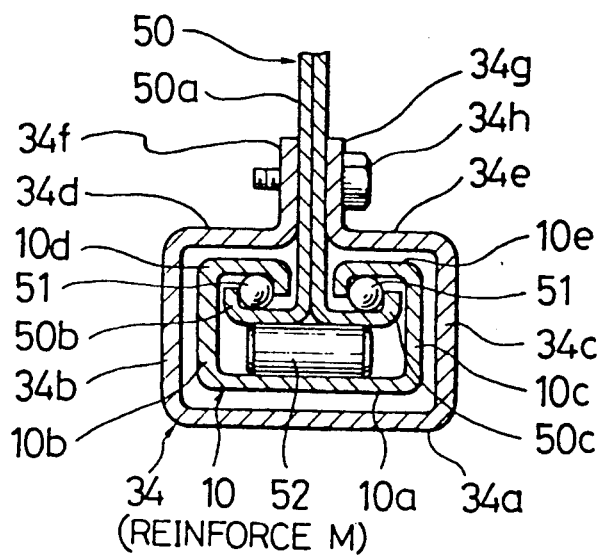
FIG. 4 is a similar cross-sectional view showing the second embodiment thereof.

FIG. 4 shows a second embodiment of the vehicle seat according to the present invention, in which a lower rail reinforcing member 34 is fixed to the upright portion 50a of the upper rail 50 with caulked pins or bolts 34h so as to enclose the outer surface of the lower rail 10 with a predetermined gap between the reinforcing member 34 and the lower rail 10. The lower rail reinforcing member 34 is formed with a bottom wall portion 34a facing the base wall portion 10a of the lower rail 10; two side wall portions 34b and 34c extending from both sides of the bottom wall portion 34a facing the two side wall portions 10b and 10c of the lower rail 10, respectively; two upper bent portions 34d and 34e inwardly bent from the upper ends of two side wall portions 34b and 34c facing the two upper flange portions 10d and 10e of the lower rail 10, respectively; and two mounting portions 34f and 34g upwardly bent from the inner ends of the two upper bent portions 34d and 34e so as to sandwich the upright portion 50a of the upper rail 50. In this second embodiment, since the two mounting portions 34f and 34g of the reinforcing member 34 are fixed to the upright portion 50a of the upper rail 50, the rigidity of the upper rail 50 is also increased. In this second embodiment, after the lower rail 10 has been deformed, the lower rail 10 can be reinforced by the reinforcing member 34, because the further deformation of the lower rail 10 can be prevented by the presence of the reinforcing member 34.

Figure 5:
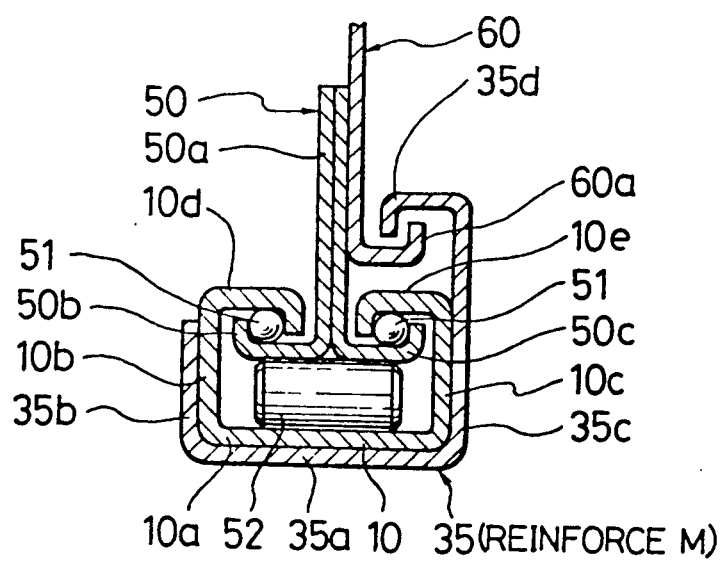
FIG. 5 is a similar cross-sectional view showing the third embodiment thereof.

FIG. 5 shows a third embodiment of the vehicle seat according to the present invention, in which a lower rail reinforcing member 35 is pressure fitted to the outside surface of the lower rail 10 and additionally part of the reinforcing member 35 is engaged with a lower bent portion 60a of the seat base plate 60 with a gap between the two. In more detail, the lower rail reinforcing member 35 is formed with a bottom wall portion 35a in contact with the base wall portion 10a of the lower rail 10; two side wall portions 35b and 35c extending from both sides of the bottom wall portion 35a in contact with the two side wall portions 10b and 10c of the lower rail 10, respectively; and a reverse U-shaped extension portion 35d extending from the side wall portion 35c so as to be engaged with a lower U-shaped bent portion 60a of the seat base plate 60.

In this third embodiment, since the reverse U-shaped extension portion 35d of the lower rail reinforcing member 35 is opposed to the U-shaped bent portion 60a of the seat base plate 60, in case a large load is applied to the seat base plate 60, the two bent portions 60a and 35d are engaged with each other to reinforce the seat base plate 60 and the upper rail 50, so that it is possible to reduce the deformation of the lower rail 10.

Figure 6:
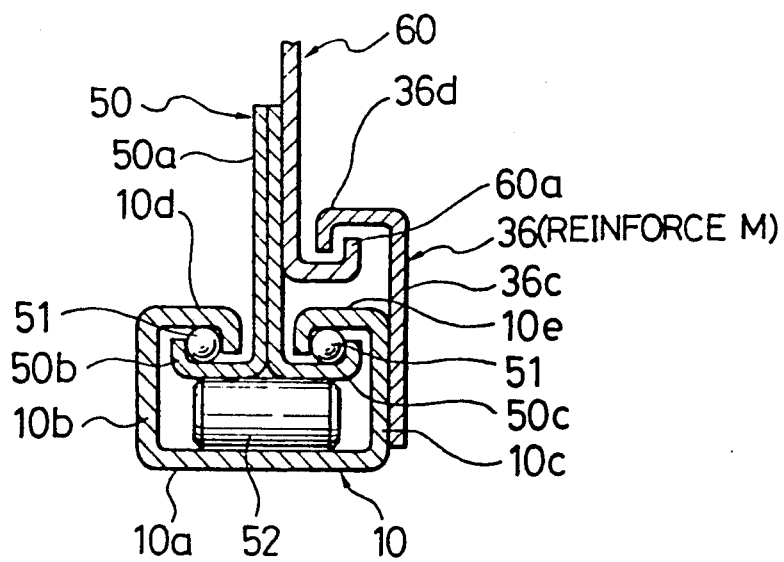
FIG. 6 is a similar cross-sectional view showing a modification of the third embodiment.

FIG. 6 shows a modification of the third embodiment, in which the lower rail reinforcing member 36 is formed with a single side wall portion 36c fixed to the side wall portion 10c of the lower rail 10 and a reverse U-shaped extension portion 36d extending from the side wall portion 36c so as to be opposed to the lower U-shaped bent portion 60a of the seat base plate 60. The function thereof is roughly the same as the reinforcing member 35 shown in FIG. 5.

As described above, in the vehicle seat according to the present invention, since the lower rail reinforcing member is provided for the lower rail in the vicinity of the seat belt anchor mounting portion, it is possible to prevent the lower rail from being deformed by a large load generated at vehicle collision, for instance. As a result, since it is possible to prevent the upper rail from being removed from the lower rail, it is possible to improve the safety of the seat belt whose one end is connected to the seat belt anchor attached to the vehicle seat, so that the driver will not collide against the instrument panel in case of accident.

What is claimed is:

1. A vehicle seat, comprising:
   (a) a pair of lower rails (10) arranged in parallel to each other at an interval;

(b) a pair of upper rails (50) slidably engaged with said lower rails, respectively;

(c) a pair of seat base plates (60) fixed to said upper rails, respectively for mounting a seat cushion;

(d) a seat belt anchor (20) attached to one of said seat base plates, for anchoring one end of a seat belt; and (e) a lower rail reinforcing member (35) provided for said lower rail in the vicinity of said seat belt anchor, for reinforcing the strength of said lower rail required at vehicle collision, said lower rail reinforcing member including a substantially U-shaped cross-section member (35a, 35b, 35cl) and a reverse U-shaped extension portion (35d) extending from a side wall portion (35c) of said substantially u-shaped cross-section member so as to be engaged with a lower U-shaped bent portion (60a) of said seat base plate (60), said substantially u-shaped cross-section member being pressure fitted to an outer surface of said lower rail.

* * * * *